United States Patent
Berg (10) Patent No.: US 11,133,585 B2
(45) Date of Patent: Sep. 28, 2021

(54) RADAR BEAMFORMING

(71) Applicant: Sivers Ima AB, Kista (SE)

(72) Inventor: Håkan Berg, Harestad (SE)

(73) Assignee: SIVERS WIRELESS AB

( * ) Notice: Subject to any disclaimer, the term of this patent is extended or adjusted under 35 U.S.C. 154(b) by 232 days.

(21) Appl. No.: 16/262,670

(22) Filed: Jan. 30, 2019

(65) Prior Publication Data

US 2019/0237871 A1 Aug. 1, 2019

(30) Foreign Application Priority Data

Jan. 31, 2018 (EP) .................................... 18154523

(51) Int. Cl.
*H01Q 3/34* (2006.01)
*G01S 7/35* (2006.01)
(Continued)

(52) U.S. Cl.
CPC ............. *H01Q 3/34* (2013.01); *G01S 7/2813* (2013.01); *G01S 7/352* (2013.01); *G01S 7/354* (2013.01);
(Continued)

(58) Field of Classification Search
CPC .... H04B 7/0695; H04B 7/0617; H04B 7/088; H04B 7/0408; H04B 7/0413; H04B 7/10;
(Continued)

(56) References Cited

U.S. PATENT DOCUMENTS 5,434,576 A * 7/1995 Haupt ....................... G01S 3/06
342/378
5,481,270 A * 1/1996 Urkowitz .............. G01S 13/582
342/101
(Continued)

FOREIGN PATENT DOCUMENTS

DE 100 36 132 A1 2/2002

OTHER PUBLICATIONS

Metz C et al: 11 Performance of thinned antenna arrays using nonlinear processing in DBF radar applications. Phoenix, AZ, May 20-25, pp. 275-278, vol. I, XP032405507, ISBN: 978-0-7803-6538-4.
(Continued)

*Primary Examiner* — Olumide Ajibade Akonai
(74) *Attorney, Agent, or Firm* — Condo Roccia Koptiw LLP (57) ABSTRACT

An active electronically steerable receive antenna may comprise an antenna array that includes multiple receive antenna elements. Reflected radar signals may be received at the receive antenna elements, and received signals may be obtained from the receive antenna elements. The received signals may be processed via at least frequency down-conversion, analog-to-digital conversion, generation of digital signals, and alignment of the received signals or the digital signals for a predetermined angle of incidence. Multiple signals including a sum beamforming signal and a product beamforming may be multiplied to determine a (Continued)

beamformed signal. The sum beamforming signal and the product beamforming signal may be respectively determined by summing or multiplying at least two of the digital signals. The product beamforming signal may be a grating lobe suppression signal that suppresses grating lobes of the sum beamforming signal when multiplied with the sum beamforming signal.

20 Claims, 7 Drawing Sheets

(51) Int. Cl.
*G01S 13/42* (2006.01)
*H01Q 21/22* (2006.01)
*G01S 7/28* (2006.01)
*H01Q 23/00* (2006.01)
*H01Q 3/26* (2006.01)
*G01S 7/52* (2006.01)
*G01S 13/02* (2006.01)
*G01S 13/34* (2006.01)

(52) U.S. Cl.
CPC .......... *G01S 7/52047* (2013.01); *G01S 13/42* (2013.01); *H01Q 3/2617* (2013.01); *H01Q 21/22* (2013.01); *H01Q 23/00* (2013.01); *G01S 13/02* (2013.01); *G01S 13/0209* (2013.01); *G01S 13/34* (2013.01); *G01S 2013/0245* (2013.01); *G01S 2013/0254* (2013.01)

(58) Field of Classification Search
CPC ...... H04B 3/232; H04B 1/7174; H04B 7/086; H04B 7/01; H04W 16/28; G01S 13/931; G01S 7/352; G01S 2007/356; G01S 7/354; G01S 7/2813; G01S 13/0209; G01S 13/34; G01S 2013/0245; G01S 13/02; G01S 2013/0254; G01S 13/88; G01S 7/28; G01S 7/52047; G01S 7/52023; H01Q 3/36; H01Q 21/065; H01Q 3/38; H01Q 3/34; H01Q 13/42; H01Q 21/22; H01Q 23/00; H01Q 3/2617; H01Q 21/24; H01Q 21/064; H01Q 3/26
See application file for complete search history.

(56) References Cited

U.S. PATENT DOCUMENTS

| | | | |
|---|---|---|---|
| 6,496,158 B1* | 12/2002 | Ksienski | H01Q 3/36 342/374 |
| 2004/0027268 A1* | 2/2004 | Langsford | G01S 7/2813 342/16 |
| 2008/0068266 A1* | 3/2008 | DeAgro | G01S 7/2813 342/424 |
| 2009/0115650 A1* | 5/2009 | Tietjen | H04B 1/0007 341/141 |
| 2009/0243931 A1* | 10/2009 | Weckerle | H01Q 3/267 342/372 |
| 2019/0056488 A1* | 2/2019 | Vacanti | G01S 7/003 |
| 2019/0058262 A1* | 2/2019 | Maruyama | G01S 7/2813 |

OTHER PUBLICATIONS

Timothy J Brockett et al:11 Subarray Design Diagnostics for the Suppression of Undesirable Grating Lobes. Piscataway, NJ, US, vol. 60, No. 3, Mar. 1, 2012 (Mar. 1, 2012), pp. 1373-1380, XP011429010, ISSN: 0018-926X.

* cited by examiner

RADAR BEAMFORMING

CROSS REFERENCE TO RELATED APPLICATIONS

This application claims priority from EPC Application No. 18154523.7, filed 31 Jan. 2018, the contents of which are hereby incorporated by reference herein.

BACKGROUND

In many applications where a radar, such as a continuous wave radar, e.g. FMCW (Frequency Modulated Continuous Wave) radar, or a pulsed radar, e.g. a MTI (Moving Target Indicator) radar, is used it is necessary to be able to form the beam of the transmitted radar signal as well as of the received radar signal in order to retrieve the desired information. Modern technologies have provided radar antennas which can generate beams in different directions without physically moving the antenna. That is, the antennas are electronically steerable. The present invention is related to signal processing of the received radar signal, i.e. the reflection of the transmitted radar signal. The traditional way to realize an Active Electronically Steerable Antenna (AESA), also called active electronically scanned array, is to have an array of receive antenna elements spaced by approximately half a wavelength of the received frequency. Each receive antenna element then has a circuit to delay the signal before the signals from the individual receive antenna elements are summed together. This is done in mainly three ways, as described below. As well known in the art, if the spacing of the receive antenna elements is less than half a wavelength this will provide the possibility to steer the antenna without getting grating lobes, i.e. significant beams forming in other directions than the desired one.

Figure 1A:
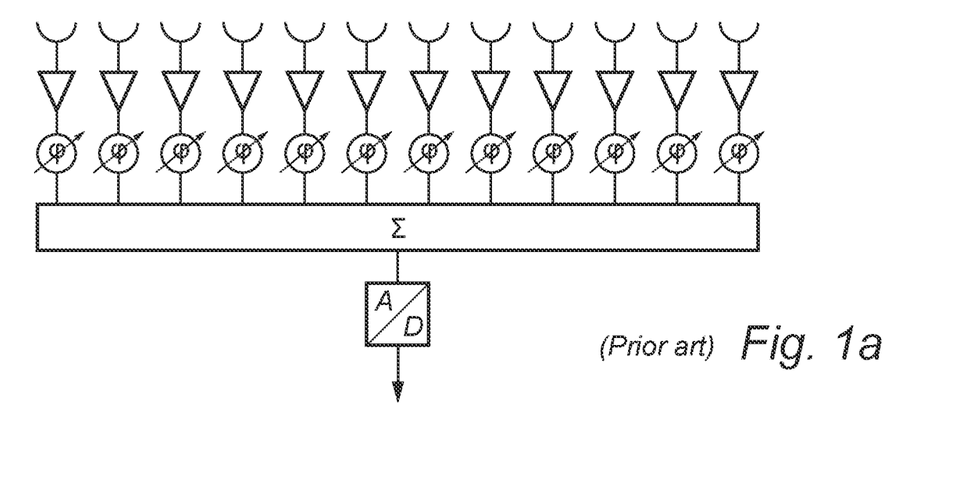
Figure 1B:
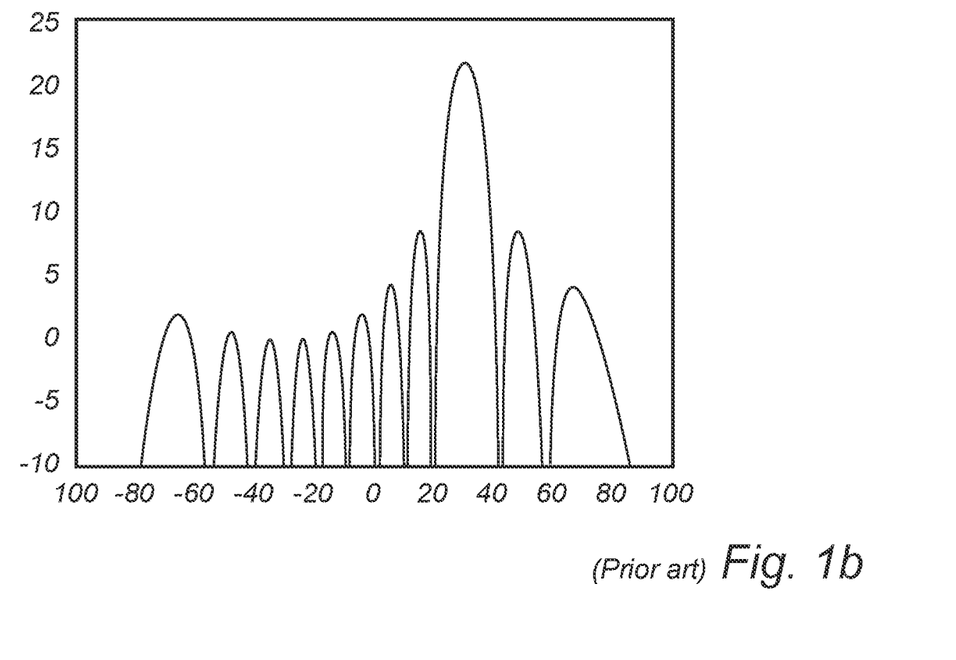
Figure 2A:
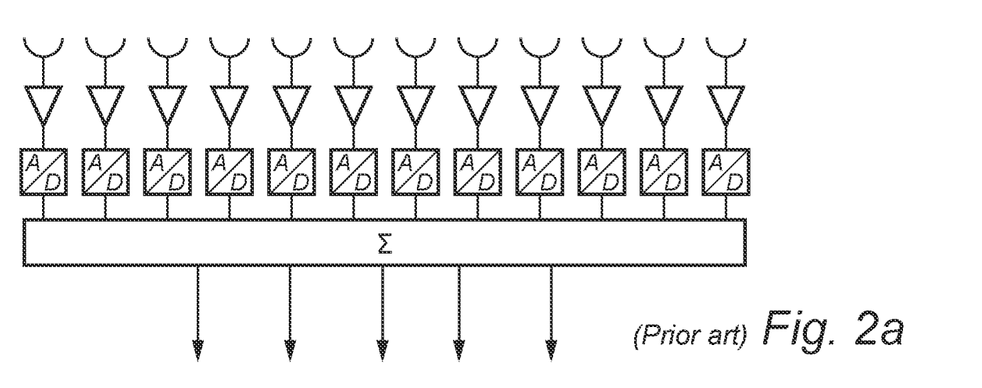
Figure 2B:
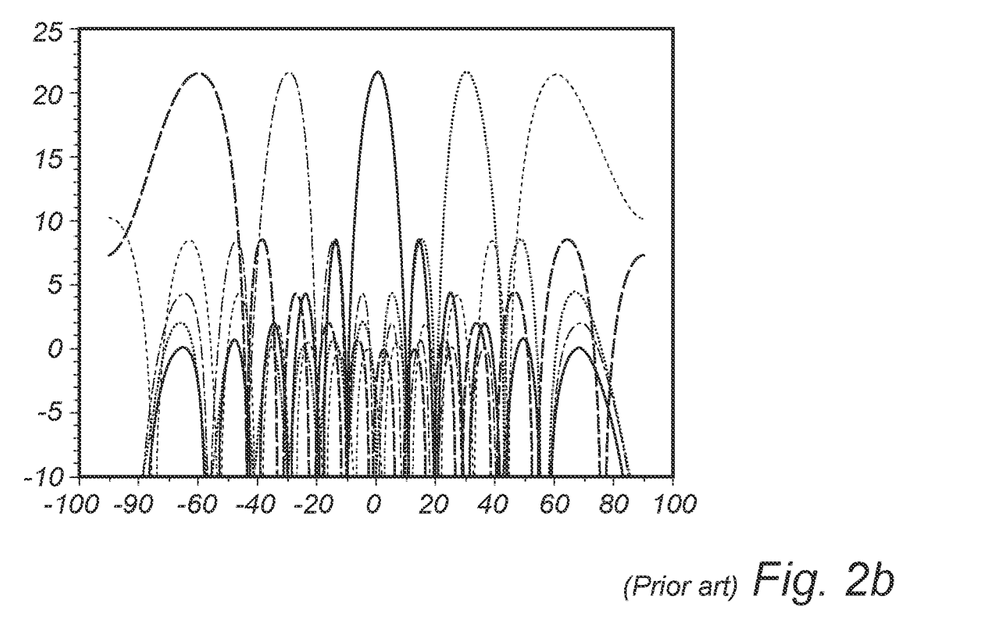

One way of beamforming is called analog beamforming, where each receive antenna element is a part of a respective channel, which additionally contains a controllable delay or phase shifter following the receive antenna element, as shown in FIG. 1a. For narrowband signals, i.e. BW<<$c_0$/D where BW is the bandwidth of the signal, $c_0$ is the speed of light and D is the width of the antenna, phase shifters work good, otherwise a controllable delay must be implemented which becomes large and lossy for large antennas. After the phase shift/delay, the channel signals are summed together creating a beam as shown in FIG. 2. The advantage of this solution is that it is rather cheap since the microwave receivers are needed anyway and one digital receiver is enough. The disadvantage is that only one beam can be synthesized simultaneously.

Digital beamforming is another alternative. The delay, and thereby the beamforming, can be done after sampling if each channel incorporates an ND-converter, see FIG. 2a. This allows to look at several directions simultaneously since data for each channel signal is stored. The delaying and summing of the data, and hence the beamforming, is done strictly mathematically. The advantage using this solution is that several beams can be formed simultaneously, see FIG. 2b. However, it is only useful to form receive beams at angles that are covered by the transmit beam. The disadvantage is that the number of A/D-converters is large and they need to be synchronized. There is also a vast amount of data to handle, although this, per se, poses less of a problem in advanced signal processing ASICs.

Figure 3A:
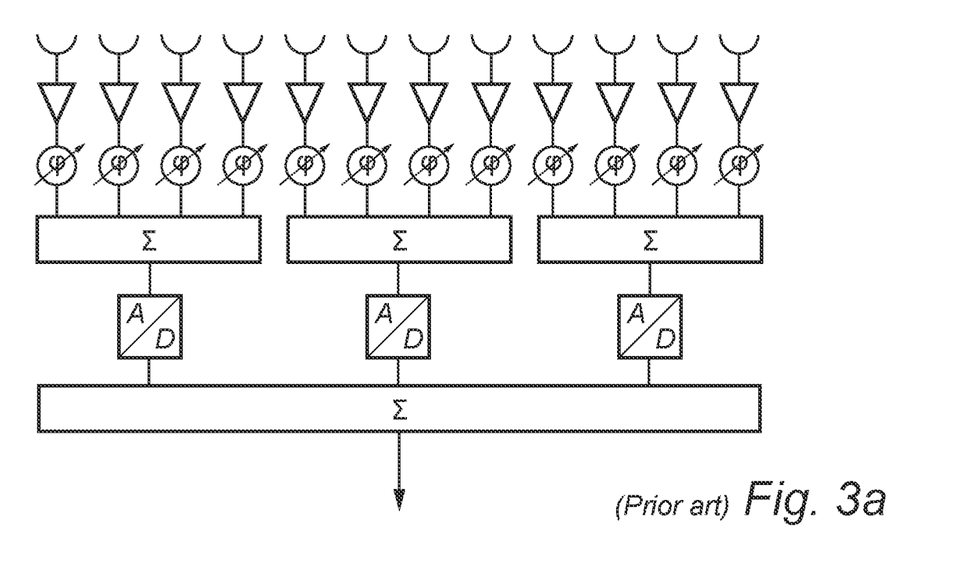
Figure 3B:
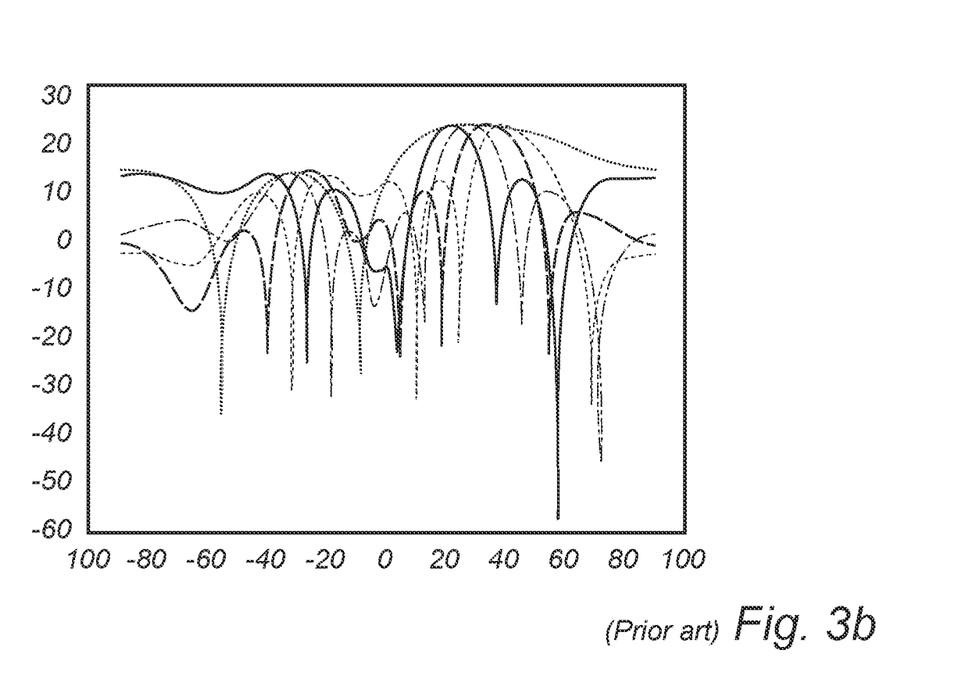

Since the transmit beam of a radar is usually not very wide it is often enough to be able to form beams simultaneously within that beam. In yet another alternative solution, called hybrid beamforming, this is done by having phase shifters at microwave frequency and summing the channel signals in groups which are then sampled, as shown in FIG. 3a. This data can be used to form narrow beams within the wider beams formed by each group, as shown in FIG. 3b.

However, a common drawback of the present AESAs is that the number of microwave receivers is defined by the antenna size, which means that for a narrow beam antenna the antenna is large and the numbers of microwave receivers is large. The number of microwave receivers and digital channels is to a large degree what is driving cost, power consumption and dimensioning of expensive cooling systems in traditional AESAs.

SUMMARY

It would be advantageous to provide a solution that reduces the above-mentioned common drawback.

To address this concern, in a first aspect of the invention there is presented a beamforming method for an active electronically steerable receive antenna, which receive antenna comprises an antenna array containing several receive antenna elements, the method comprising:
   receiving reflected radar signals at the receive antenna elements, and obtaining received signals from the receive antenna elements;
   receive processing the received signals, the receive processing comprising frequency down-conversion, and analog-to-digital conversion, thereby generating several digital signals;
   aligning the received signals or the digital signals for a predetermined angle of incidence; and
   determining a beamformed signal, comprising multiplying several signals including a sum beamforming signal, which is determined by summing at least two of the digital signals, and a product beamforming signal, which is determined by multiplying at least two of the digital signals, wherein the product beamforming signal is a grating lobe suppression signal, which suppresses grating lobes of the sum beamforming signal when multiplied with the sum beamforming signal.

This beamforming method is advantageous in that is allows the receive antenna elements to be sparsely mounted, i.e. to be mounted with larger spacings than half a wavelength, while keeping the desired final beam pattern of a narrow main lobe and significantly suppressed grating lobes. Due to the sparse mounting, in comparison with the prior art receivers, the number of receive antenna elements, and thereby the cost and power dissipation, is reduced without losing performance.

The present beamforming method can be used in any radar system where beamforming for a receiving antenna is to be used, although it is particularly useful for wideband FMCW radars due to their small baseband frequency. In many radar systems, e.g. surveillance radars, a wide transmit beam is used while the direction to a target is defined by having multiple narrow receive beams. These can be synthesized digitally after the A/D-conversion.

For a good operation of the method a relation between the bandwidth of the radar signal and the width of the antenna preferably is such that the bandwidth is large enough to provide a distance resolution at least in the order of the width of the antenna.

In accordance with an embodiment of the method it comprises determining the product beamforming signal by multiplying digital signals from receive antenna elements at opposite ends of the antenna array.

In accordance with an embodiment of the method it comprises arranging the receive antenna elements at mutual distances exceeding $\lambda/2$, where $\lambda$ is the wavelength of a carrier of the reflected radar signal.

In accordance with an embodiment of the method the receive processing further comprising transforming the digital signals to frequency domain before determining the beamformed signal.

In accordance with an embodiment of the method a range resolution of the radar beam is comparable with the width of the receive antenna.

In accordance with an embodiment of the method the width of a main lobe of a beam corresponding with the sum beamforming signal is narrower than the width of a main lobe of a beam corresponding with the product beamforming signal.

In accordance with an embodiment of the method it comprises arranging at least two adjacent receive antenna elements at a mutual distance exceeding $\lambda$, where $\lambda$ is the wavelength of a carrier of the reflected radar signal.

In accordance with an embodiment of the method the alignment is performed by aligning the digital signals in respect of arrival time of the corresponding received signals.

According to another aspect of the invention there is provided an active electronically steerable receive antenna having an antenna array containing several receive antenna elements arranged to generate received signals, frequency down-converters, connected with the receive antenna elements, analog-to-digital converters, connected with the frequency down-converters, arranged to generate digital signals, and a beamforming device connected with the analog-to-digital converters, arranged to determine a beamformed signal by multiplying several signals including a sum beamforming signal, which is determined by summing at least two of the digital signals, and a product beamforming signal, which is determined by multiplying at least two of the digital signals, wherein the product beamforming signal is a grating lobe suppression signal, which suppresses grating lobes of the sum beamforming signal when multiplied with the sum beamforming signal. The receive antenna provides corresponding advantages as the method described above.

BRIEF DESCRIPTION OF THE DRAWINGS

The invention will now be described in more detail and with reference to the appended drawings in which:

FIGS. 1a-3b illustrate prior art;

DETAILED DESCRIPTION

The present invention is focused on the receiver part of a radar, and the transmitter part will therefore only be referred to in brief, since it has a common structure well known to the person skilled in the art. The receiver part can be designed according to different principles, such as the above-mentioned hybrid receiver having both analog and digital beamforming, or digital receiver. In the following description it is assumed that a digital receiver with the design shown in FIG. 4 is used.

Figure 4:
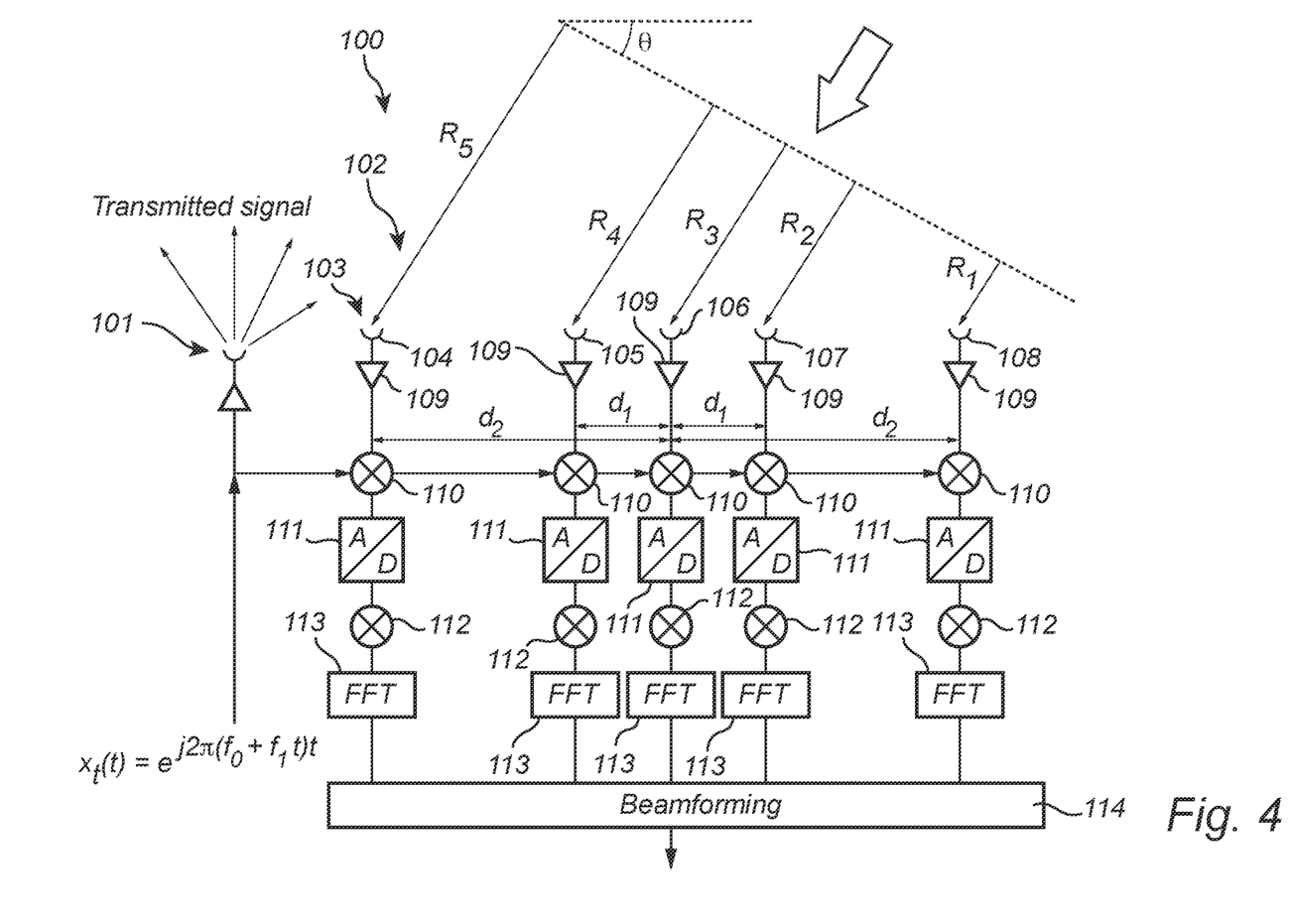
FIG. 4 is a schematic block diagram showing an embodiment of a receiver structure according to the present invention.

FIG. 4 shows an embodiment of a portion 100 of an exemplifying radar apparatus, such as an FMCW radar, comprising a transmit antenna 101, which contains one or more transmit antenna elements, and a receiver device 102. The FMCW radar has an advantage compared with other radar types in that the sampling frequency, and thereby the amount of data, can be kept comparably low, which facilitates signal processing in each channel. The receiver device 102 performs a digital beamforming, or steering, and comprises a receive antenna 103, here exemplified by an array of several receive antenna elements 104, 105, 106, 107, 108 arranged in a single row. More particularly, in this example the antenna array contains five receive antenna elements 104-108. A first distance between the centre receive antenna element 106 and the adjacent receive antenna elements 105, 107 at both sides of the centre receive antenna element 106 is $d_1$, and a second distance between the centre receive antenna element 106 and the receive antenna elements 104, 108 at the respective ends of the receive antenna 103 is $d_2$, as illustrated in FIG. 4. Thus, the total width of the receive antenna 103 is $2d_2$. The receiver device 102 comprises a receive channel for each receive antenna element 104-108, where each receive channel comprises an amplifier 109 connected with the receive antenna element 104-108, a frequency down-converter, here a mixer, 110 connected with the amplifier 109, an analog-to-digital converter 111 connected with the mixer 110, an alignment element 112 connected with the analog-to-digital (A/D) converter 111, and a Fast Fourier Transform (FFT) unit 113. For purposes of definition, such as in claim drafting, and for overall understanding, it should be noted that the amplifiers 109 can be regarded as included in the receive antenna elements 104-108, and also other combinations are possible as understood by the person skilled in the art. Similarly, other commonly used circuit components necessary for the function as a whole are of course included even if they are not explicitly shown in the drawings or mentioned in the description. Only those components relevant for describing the invention are disclosed. The receiver device 102 further comprises a beamforming unit 114, which is connected to all FFT units 113 to receive their output FFT signals. The beamforming unit 114 generates the desired beam by combining summation and multiplication of the FFT signals as will be explained below. As will be readily understood by the person skilled in the art, the receiver device 102 may comprise a further signal processing device connected to the output of the beamforming unit 114, but since such a further signal processing device does not form part of the basic inventive concept it has been omitted from this description.

It should be mentioned that in its most simplified configuration the receiver device could be regarded as comprising receive antenna elements, mixers, analog-to-digital converters and a beamforming unit. It should also be mentioned that it is understood by the person skilled in the art that the receiver device 102 may additionally comprise one or more filter units in each receive channel. Further, the frequency down-conversion can be made in several steps instead of in one step as exemplified herein.

The FMCW radar in general, and in particular the receiver device 102, operates as follows. The transmitter device 101 transmits a radar signal the frequency of which follows a frequency ramp having two portions, i.e. a first portion and a following second portion. During the first portion the frequency is ramped up from a lower start frequency to a higher end frequency, or vice versa, and during the second portion the frequency of the output signal is returned to the start frequency. The duration of the first and second portions can be equal but usually the duration of the second portion, also called resetting portion, is significantly shorter. This combination of portions is continuously repeated. There are many shapes of the ramp that are used, such as continuous increase/decrease, discontinuous, e.g. stepwise, increase/decrease, etc. The transmitted radar signal $x_{tx}(t)$ is reflected against a remote object, called a target. The reflected signal $x_{rx}(t)$ is received at the receive antenna 103 of the receiver device 102. Typically, the reflected signal is received at an angle θ to the normal direction of the receive antenna elements 104-108. The receive antenna elements 104-108 output received signals $x_n(t)$, where n denotes which receive antenna element 104-108 the received signal comes from, as illustrated in step 81 of FIG. 8. As understood by the person skilled in the art, due to distance differences between the reflecting object and the receive antenna elements 104-108 the frequency and phase slightly differ between, and are unique, for each received signal $x_n(t)$. The received signals $x_n(t)$ are frequency down-converted by means of the mixers 110, and analog-to-digital converted by means of the A/D converters 111 to digital signals $x'_n(t)$, in step 82. The digital signals are aligned by means of the alignment elements 112, in step 83, and finally transformed to frequency domain, by means of the FFT units 113. The alignment is done due to the difference in arrival time of the reflected signal at the different receive antenna elements 104-108. It should however be noted that in this embodiment, with an FMCW radar, the time difference corresponds with a frequency difference, and therefore the alignment is performed by means of frequency shifting, such that all signals originating from the receive antenna elements 104-108 are aligned as regards their phase and frequency for a chosen angle of incidence θ. Since this in practice, in this embodiment, is done by multiplying the received signals with alignment signals, the alignment elements 112 are illustrated with mixer symbols. In other embodiments though, and for other radar types, the alignment can be performed by means of a phase shift, etc. After alignment the digital signals are denoted $y_n(t, θ_0)$, where $θ_0$ is the desired centre angle of the beam. When output from the FFT units 113 the digital signals are denoted $Y_n(f, θ_0)$. The beamforming is performed by means of the FFT signals $Y_n(f, θ_0)$, i.e. by the digital signals in frequency domain, as follows. It should be noted that, as understood by the person skilled in the art, any frequency transform can be used, but the FFT is widely employed due to its relatively low complexity of calculations. Additionally, it should be noted that the below calculations for generating the beamformed signal could be done without frequency transforming the digital signals, i.e. in time domain, but at present that is less desired.

The spacing between the antenna elements in an AESA is determined from the frequency and the amount of steering it should support. It shall preferably be less than half a wavelength of the carrier. Otherwise grating lobes will be generated due to the repetitive behavior of the microwave. In this embodiment, as mentioned above, it is assumed that the receive antenna 103 contains five receive antenna elements 104-108. Unlike the prior art and in contrast to the conventional way of designing the ASEA, in this embodiment the first distance $d_1=1.5λ$, and the second distance $d_2=4.5λ$, where λ is the wavelength of the carrier. This means that the distance between the respective end receive antenna element 104, 108 and its respective adjacent receive antenna element 105, 107 is $d_2-d_1=3λ$. With such large distances, i.e. spacings, between adjacent receive antenna elements 104-108 the beams of the resulting FFT signals $Y_n(f, θ_0)$ typically have a main lobe and grating lobes of significant magnitudes, even similar magnitudes as the main lobe, occurring too close to the main lobe. If using any of the common methods for beamforming, the grating lobes would not be suppressed to such an extent that the FFT signals $Y_n(f, θ_0)$ would be very useful for the further signal processing, as has been thoroughly shown in prior art. A conventional receive antenna of the same size would have at least about 16 receive antenna elements instead of 5 to keep the spacing at λ/2 or less.

However, in accordance with the present embodiment, this problem is solved by a combination of summing and multiplying the digital signals, and more particularly the frequency transformed digital signals $Y_n(f, θ_0)$. From left to right in FIG. 4 the FFT signals are denoted $Y_1(f, θ_0)$ to $Y_5(f, θ_0)$. In other words, the FFT signal determined on the receive signal from the end receive antenna element 104 at the left end of the receive antenna 103 is denoted $Y_1(f, θ_0)$, the FFT signal of the adjacent receive antenna element 105 to the right thereof is denoted $Y_2(f, θ_0)$, and so on to the FFT signal of the right most receive antenna element 108, which is denoted $Y_5(f, θ_0)$. As described above, the FFT signals are aligned with respect to frequency and phase, and the alignment was made in the time domain. It would be possible to perform the alignment on the FFT signals instead. However, that is presently less preferred due to a higher calculation load. Furthermore, the alignment as such would be possible to perform already before down-converting the received signals, i.e. in RF state, by means of true-time delay circuits constituting the alignment elements. However, there are some drawbacks with such an arrangement.

Figure 8:
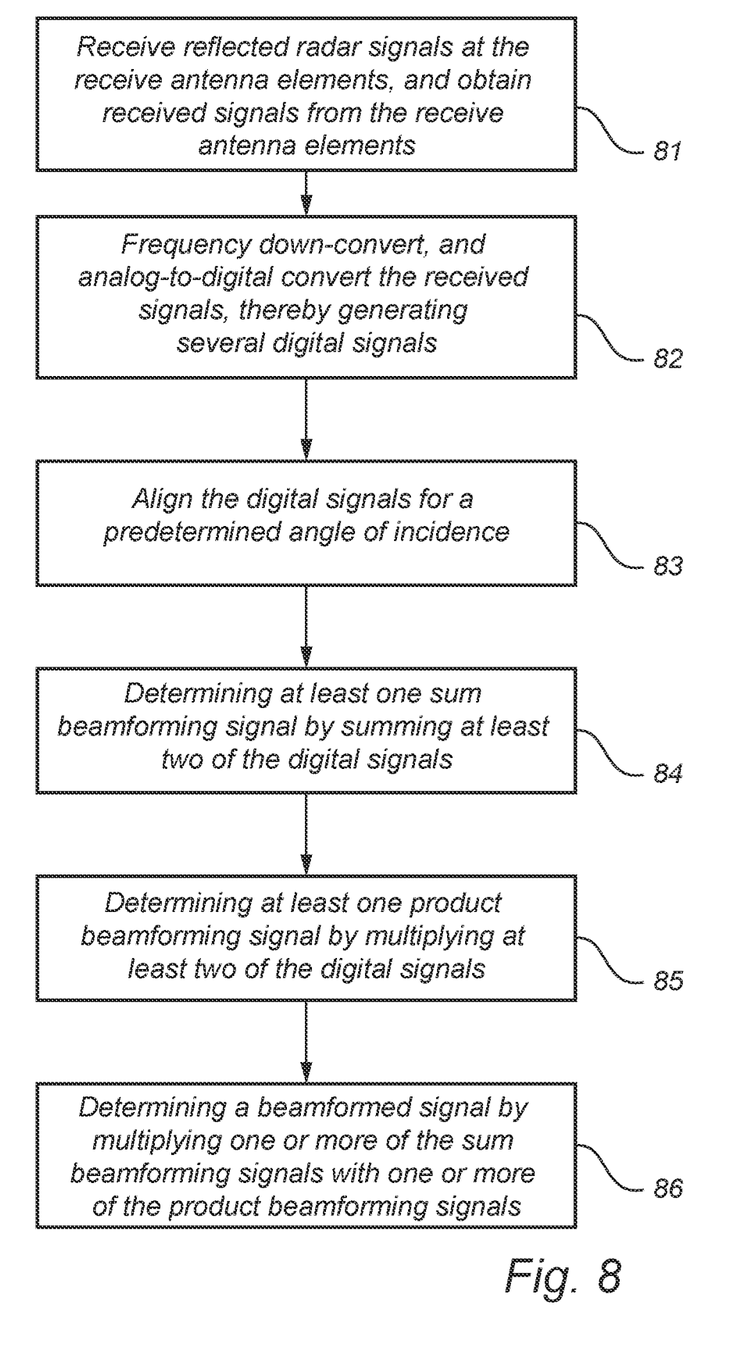
FIG. 8 is a flow chart illustrating an embodiment of the method according to the present invention.

Generally expressed, the determination of the beamformed signal includes the following steps. At least one sum beamforming signal is determined by summing at least two of the digital signals $Y_n(f, θ_0)$, in step 84. Further, at least one product beamforming signal is determined by multiplying at least two of the digital signals $Y_n(f, θ_0)$, in step 85. This includes that, if appropriate, one or more additional product beamforming signal can be determined by multiplying sum beamforming signals with each other. Finally, the beamformed signal is determined by multiplying one or more of the sum beamforming signals with one or more of the product beamforming signals, in step 86.

A simulation where the reflecting target was not moving, i.e. without any Doppler frequency deviation, and with a non-significant noise level, was performed. The resulting FFT signals was summed and multiplied as will be described below, rendering the intermediate and final beam patterns as shown in FIGS. 5-7, where the reflection angle θ in degrees is represented at the x axis, and the suppression in dB is represented at the y axis.

Figure 5:
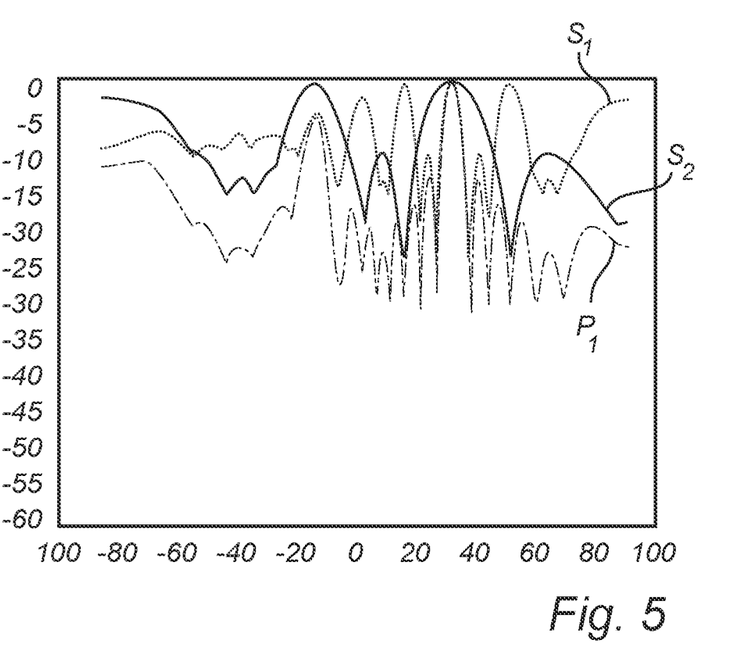
FIGS. 5-7 are diagrams illustrating beam patterns.
Figure 6:
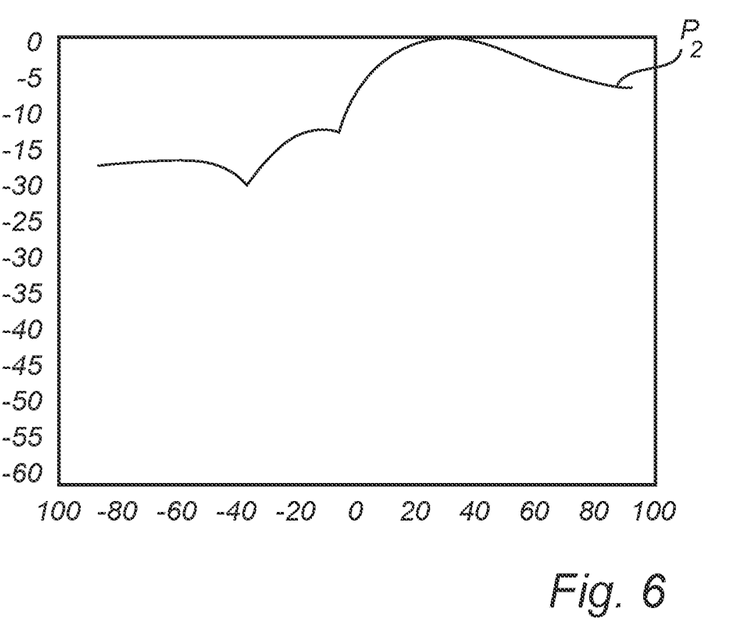

A first sum beamforming signal $S_1$ was calculated as the sum of the FFT signals of the end receive antenna elements 104, 108, and the centre receive antenna element 106, i.e. $S_1(f, θ_0)=Y_1(f, θ_0)+Y_3(f, θ_0)+Y_5(f, θ_0)$, see FIG. 5. The first sum beamforming signal $S_1$ has significant grating lobes. A second sum beamforming signal $S_2$ was calculated as the sum of the FFT signals of the three receive antenna elements 105, 106, 107 in the middle of the receive antenna 103, i.e. $S_2(f, θ_0)=Y_2(f, θ_0)+Y_3(f, θ_0)+Y_4(f, θ_0)$. The second sum beamforming signal $S_2$ has significant grating lobes as well, see FIG. 5. Further, a first product beamforming signal $P_1(f, θ_0)$ was calculated by multiplying the first and second sum beamforming signals with each other, i.e. $P_1=S_1*S_2$, generating a beam having a narrow main lobe and slightly to significantly suppressed grating lobes. A second product beamforming signal $P_2$ is calculated by multiplying the FFT signals of the end receive antenna elements 104, 108, i.e. $P_2(f, θ_0)=Y_1(f, θ_0)*Y_5(f, θ_0)$, see FIG. 6. The beam generated by the second product beamforming signal $P_2$ has a broad main lobe and significantly suppressed grating lobes.

Figure 7:
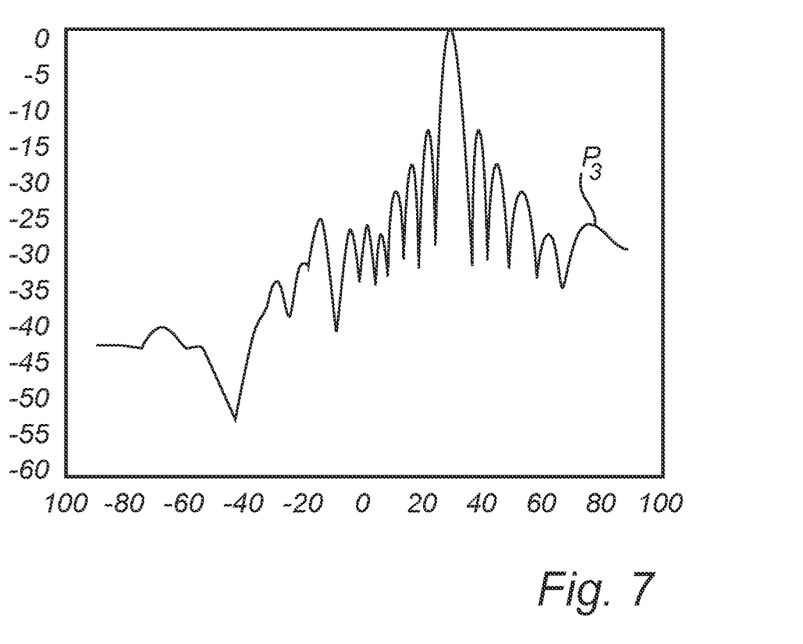

By multiplying the sum and second product beamforming signals a third product beamforming signal $P_3=P_1*P_2$ is generated, see FIG. 7. The third product signal is the resulting beamformed signal, which will be generally denoted as $S_{tot}(f, \theta_0)$, that is output from the beamforming unit 114 for further signal processing. That further processing is commonly known as such to the person skilled in the art and therefore will not be further described herein. The beam pattern corresponding with the third product signal $P_3$ has a narrow main lobe and significantly suppressed grating lobes, as shown in FIG. 7. More generally expressed, at least one sum beamforming signal is determined by summing, for each sum beamforming signal, at least two of the digital signals, and at least one product beamforming signal is determined by multiplying, for each product beamforming signal, at least two of the digital signals. Finally, a beamformed signal, i.e. the resulting signal, is generated by multiplying the at least one sum beamforming signal with the at least one product beamforming signal. Thus, in the simplest case, one sum beamforming signal is multiplied with one product beamforming signal, while in the above example two sum beamforming signals were used. More sums and products can be determined to provide additional beamforming signals, which are all finally multiplied together to generate the beamformed signal. As a further example all FFT signals could be multiplied together, but that would cause an unnecessary burden of calculation.

As an alternative to the example above the following calculations could be made for the same example of five receive antenna elements 104-108. A first sum beamforming signal is determined as $S_1=Y_1+Y_2+Y_3+Y_4+Y_5$, a first product beamforming signal is determined as $P_1=Y_1*Y_1$, and the beamformed signal as $S_{tot}=S_1*P_1$. Introducing mathematical expressions for the signals, the calculations can be described as follows. For the exemplifying FMCW radar, the transmitted signal can be represented by $x_t(t)$ as $$x_t(t) = e^{j2\pi(f_0+f_1t)t}$$

Where $f_1 t$ represents the difference frequency. For a basic example of the frequency modulation of an FMCW radar the frequency is linearly increased during a sweep, and then returned to the starting frequency. This can be represented by $f_1 = BW/\tau$, where $\tau$ is the sweep time. Then the receive antenna element signals are $$x_n(t) = e^{j2\pi(f_0+f_1t)\left(t-\frac{2R_0+R_n}{c_0}\right)}$$

where $R_0$ is the propagation distance from the reflecting object to a reference point at the receive antenna, such as a centre point or an edge point of the receive antenna 103. $R_n$ is the additional distance to the respective receive antenna element 104-108, which is dependent on the incident angle $\theta$, such that $R_0 = d_n \sin\theta$, where $d_n$ is the lateral distance between the reference point and the respective receive antenna element 104-108. After A/D conversion the digital signals are:

$$x'_n(t) = e^{-j2\pi(f_0+f_1t)\frac{2R_0+R_n}{c_0}} = e^{-j2\pi(f_0+f_1t)\frac{2R_0+R_d\sin\theta}{c_0}}$$

The following alignment can be expressed as $$y_n(t,\theta_0) = x'_n e^{j2\pi(f_0+f_1t)\frac{d_n\sin\theta_0}{c_0}} = e^{-j2\pi(f_0+f_1t)\frac{2R_0+d_n(\sin\theta-\sin\theta_0)}{c_0}}$$

Considering that $$\lambda_0 = c_0/f_0, \lambda_{BW} = c_0/f_1\tau$$

renders:

$$y_n(t,\theta_0) = e^{-j2\pi f_0\frac{2R_0+d_n(\sin\theta-\sin\theta_0)}{c_0}} e^{-j2\pi f_1 t \frac{2R_0+d_n(\sin\theta-\sin\theta_0)}{c_0}} =$$
$$e^{-j2\pi\frac{2R_0}{\lambda_0}} e^{-j2\pi\frac{2R_0 t}{\lambda_{BW}\tau}} e^{-j2\pi\frac{d_n(\sin\theta-\sin\theta_0)}{\lambda_0}} e^{-j2\pi\frac{d_n(\sin\theta-\sin\theta_0)t}{\lambda_{BW}\tau}}$$

The final FFT signals are then expressed as follows:

$$Y_n(f,\theta_0) =$$
$$e^{-j2\pi\frac{2R_0}{\lambda_0}} e^{-j2\pi\frac{d_n(\sin\theta-\sin\theta_0)}{\lambda_0}} \text{sinc}\left(\pi\left(f\tau + \frac{2R_0}{\lambda_{BW}} + \frac{d_n(\sin\theta-\sin\theta_0)}{\lambda_{BW}}\right)\right)$$

In the expression for the FFT signals, the term $$e^{-j2\pi\frac{d_n(\sin\theta-\sin\theta_0)}{\lambda_0}}$$

defines phase difference for the receive antenna elements 104-108, and the term $d_n(\sin\theta - \sin\theta_0)/\lambda_{BW}$ defines frequency difference for the receive antenna elements 104-108.

The sum beamforming signals and the product beamforming signals can be expressed as $$S_1(f,\theta_0) = \sum Y_n(f,\theta_0)$$
$$P_1(f,\theta_0) = \prod Y_n(f,\theta_0)$$

and the final beamformed signal $S_{tot}$ as $$S_{tot}(f,\theta_0) = S_1(f,\theta_0) P_1(f,\theta_0)$$

or more generally $$S_{tot}(f,\theta_0) = S_1(f,\theta_0) S_2(f,\theta_0) \ldots S_n(f,\theta_0) P_1(f,\theta_0)$$
$$P_2(f,\theta) \ldots P_n(f,\theta_0)$$

It can be noted that for reflection angles $\theta \neq \theta_0$ the amplitude of the sum signals $S_n(f, \theta_0)$ changes fast when e changes, but the high amplitude repeats itself due to the periodicity leading to significant grating lobes. On the other hand, the amplitude of the product signals $P_n(f,\theta_0)$ changes slow when e changes and the high amplitude does not repeat itself.

As evident from the above example it is possible to form a very narrow beam with only five receive antenna elements 104-108. However, the method is based on some requisites to work well. The relative bandwidth $BW_{rel} = BW/f_0$ of the transmitted/reflected signal should be large. If the relative bandwidth is large one can use the frequency difference over the antenna due to difference in distance to the target to form a wide beam without grating lobes. This is possible if the range resolution is comparable to the size of the antenna. As an example, the following figures have been used. Carrier frequency $f_0$=60 GHz; width of receive antenna D=$9\lambda_0$=45 mm, Absolute bandwidth $BW_{abs}$=6 GHz; range resolution $r \approx c_0/BW_{abs}$=50 mm. However, the method is of course applicable to any carrier frequency in the microwave band.

Consequently, by combining the range resolution given from a large bandwidth together with the beamforming according to the present method, a narrow beam can be formed with only few receive antenna elements, partly because the receive antenna elements can be positioned with large spacings, typically up to several wavelengths. This can reduce both cost, power dissipation and amount of data to be processed. As understood by the person skilled in the art, the method is applicable to receive antennas having considerably more receive antenna elements than exemplified above as well, if desired to, for instance, design a wider receive antenna, or design a two-dimensional antenna. However, also in these cases the receive antenna elements can be sparsely arranged with spacings larger than half a wavelength.

While the invention has been illustrated and described in detail in the drawings and foregoing description, such illustration and description are to be considered illustrative or exemplary and not restrictive; the invention is not limited to the disclosed embodiments.

For instance, the method is not dependent on the number of receive antenna elements, as long as they are at least two. As explained above, an effect of the method is that irrespective of the physical size of the radar antenna, a fewer number of receive antenna elements than in a conventional antenna can be used, that is a larger spacing between the receive antenna elements can be applied.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A beamforming method for an active electronically steerable receive antenna, the receive antenna comprising an antenna array including a plurality of receive antenna elements, the method comprising:
  receiving reflected radar signals at the receive antenna elements, and obtaining received signals from the receive antenna elements;
  processing the received signals, wherein the processing comprises frequency down-conversion and analog-to-digital conversion, and wherein the processing generates a plurality of digital signals;
  aligning the received signals or the digital signals for a predetermined angle of incidence; and
  determining a beamformed signal, wherein the determining comprises multiplying a plurality of signals including a sum beamforming signal and a product beamforming signal, the sum beamforming signal determined by summing at least two of the digital signals, the product beamforming signal determined by multiplying at least two of the digital signals, wherein the product beamforming signal comprises a grating lobe suppression signal, and wherein the grating lobe suppression signal suppresses grating lobes of the sum beamforming signal when multiplied with the sum beamforming signal.

2. The beamforming method according to claim 1, further comprising determining the product beamforming signal by multiplying digital signals from at least receive antenna elements at opposite ends of the antenna array.

3. The beamforming method according to claim 1, further comprising arranging the receive antenna elements at mutual distances exceeding $\lambda/2$, wherein $\lambda$ is the wavelength of a carrier of the reflected radar signals.

4. The beamforming method according to claim 1, wherein the processing further comprises transforming the digital signals to frequency domain before determining the beamformed signal.

5. The beamforming method according to claim 1, wherein a range resolution given by a bandwidth of the radar signals is approximately equal to or smaller than the width of the receive antenna.

6. The beamforming method according to claim 1, wherein the width of a main lobe of a beam corresponding with the sum beamforming signal is narrower than the width of a main lobe of a beam corresponding with the product beamforming signal.

7. The beamforming method according to claim 1, further comprising arranging at least two adjacent receive antenna elements at a mutual distance exceeding $\lambda$, wherein $\lambda$ is the wavelength of a carrier of the reflected radar signals.

8. The beamforming method according to claim 1, wherein the aligning comprises aligning the digital signals in respect of an arrival time of the corresponding received signals.

9. An active electronically steerable receive antenna, comprising:
  an antenna array including a plurality of receive antenna elements arranged to generate received signals,
  a plurality of frequency down-converters connected with the receive antenna elements,
  a plurality of analog-to-digital converters connected with the frequency down-converters and arranged to generate digital signals,
  a plurality of alignment elements connected with the analog-to-digital converters or with the receive antenna elements, and
  a beamforming device connected with the analog-to-digital converters and arranged to determine a beamformed signal by multiplying multiple signals including a sum beamforming signal and a product beamforming signal, the sum beamforming signal determined by summing at least two of the digital signals, and the product beamforming signal determined by multiplying at least two of the digital signals, wherein the product beamforming signal comprises a grating lobe suppression signal, and wherein the grating lobe suppression signal suppresses grating lobes of the sum beamforming signal when multiplied with the sum beamforming signal.

10. The active electronically steerable receive antenna of claim 9, wherein the product beamforming signal is determined by multiplying digital signals from at least receive antenna elements at opposite ends of the antenna array.

11. The active electronically steerable receive antenna of claim 10, wherein the receive antenna elements are configured to receive reflected radar signals, the receive antenna elements being arranged at mutual distances exceeding λ/2, λ being the wavelength of a carrier of the reflected radar signals.

12. The active electronically steerable receive antenna of claim 10, wherein the digital signals are transformed to frequency domain before being used by the beamforming device to determine the beamformed signal.

13. The active electronically steerable receive antenna of claim 10, wherein the receive antenna elements are configured to receive reflected radar signals and a range resolution given by a bandwidth of the radar signals is substantially equal to or smaller than the width of the receive antenna.

14. The active electronically steerable receive antenna of claim 10, wherein the width of a main lobe of a beam corresponding with the sum beamforming signal is narrower than the width of a main lobe of a beam corresponding with the product beamforming signal.

15. The active electronically steerable receive antenna of claim 10, wherein the receive antenna elements are configured to receive reflected radar signals and at least two adjacent receive antenna elements are arranged at a mutual distance exceeding λ, λ being the wavelength of a carrier of the reflected radar signals.

16. The active electronically steerable receive antenna of claim 10, wherein the digital signals are aligned in respect of arrival time of the corresponding received signals.

17. A radar apparatus, comprising:
an active electronically steerable receive antenna, wherein the receive antenna comprises:
an antenna array that includes a plurality of receive antenna elements arranged to generate received signals,
a plurality of frequency down-converters connected with the receive antenna elements,
a plurality of analog-to-digital converters connected with the frequency down-converters and arranged to generate digital signals,
a plurality of alignment elements connected with the analog-to-digital converters or with the receive antenna elements, and
a beamforming device connected with the analog-to-digital converters and arranged to determine a beamformed signal by multiplying multiple signals including a sum beamforming signal and a product beamforming signal, the sum beamforming signal determined by summing at least two of the digital signals, and the product beamforming signal determined by multiplying at least two of the digital signals, wherein the product beamforming signal comprises a grating lobe suppression signal, and wherein the grating lobe suppression signal suppresses grating lobes of the sum beamforming signal when multiplied with the sum beamforming signal.

18. The radar apparatus of claim 17, wherein the product beamforming signal is determined by multiplying digital signals from at least receive antenna elements at opposite ends of the antenna array, the receive antenna elements are configured to receive reflected radar signals, and the receive antenna elements are arranged at mutual distances exceeding λ/2, λ being the wavelength of a carrier of the reflected radar signals.

19. The radar apparatus of claim 18, wherein the digital signals are transformed to frequency domain before being used by the beamforming device to determine the beamformed signal.

20. The radar apparatus of claim 19, wherein a range resolution given by a bandwidth of the radar signals is substantially equal to or smaller than the width of the receive antenna.

* * * * *